United States Patent [19]

Georgis et al.

[11] Patent Number: 5,680,269
[45] Date of Patent: Oct. 21, 1997

[54] METHOD AND APPARATUS FOR CONTROLLING MEDIA LINEAR SPEED IN A HELICAL SCAN RECORDER BY READING SERVO INFORMATION JUST AFTER WRITING THE SERVO INFORMATION

[75] Inventors: Steven P. Georgis; James Zweighaft; Timothy C. Hughes, all of Boulder, Colo.

[73] Assignee: Exabyte Corporation, Boulder, Colo.

[21] Appl. No.: 337,620

[22] Filed: Nov. 10, 1994

Related U.S. Application Data

[63] Continuation-in-part of Ser. No. 150,726, Nov. 12, 1993, abandoned.

[51] Int. Cl.$^6$ .................................................. G11B 15/52
[52] U.S. Cl. ............................... 360/73.12; 360/77.13; 360/31
[58] Field of Search ........................... 360/77.13, 77.14, 360/70, 73.11, 73.12, 27, 31, 73.09, 73.13, 77.12

[56] References Cited

U.S. PATENT DOCUMENTS

| | | |
|---|---|---|
| 3,984,868 | 10/1976 | Ragle et al. . |
| 4,107,745 | 8/1978 | Burke, Jr. . |
| 4,125,881 | 11/1978 | Eige et al. ................................. 360/50 |
| 4,157,488 | 6/1979 | Allan . |
| 4,256,996 | 3/1981 | Brooks et al. . |
| 4,370,683 | 1/1983 | Greig et al. . |
| 4,400,745 | 8/1983 | Shu . |
| 4,448,368 | 5/1984 | Skalko . |
| 4,542,424 | 9/1985 | Ishihara ..................................... 360/73 |
| 4,794,473 | 12/1988 | Kawasaki ............................. 360/73.12 |
| 4,835,628 | 5/1989 | Hinz et al. ............................... 360/48 |
| 4,843,495 | 6/1989 | Georgis et al. ........................ 360/77.13 |
| 4,945,426 | 7/1990 | Okamoto et al. ....................... 360/70 |
| 5,012,989 | 5/1991 | Whyte, Jr. et al. . |
| 5,055,952 | 10/1991 | Noh .................................... 360/77.14 |
| 5,065,261 | 11/1991 | Hughes et al. ......................... 360/70 |
| 5,068,757 | 11/1991 | Hughes et al. ...................... 360/77.13 |
| 5,095,394 | 3/1992 | Yanagihara ........................ 360/77.14 |
| 5,124,853 | 6/1992 | Kashida et al. .................... 360/77.14 |
| 5,142,422 | 8/1992 | Zook et al. ............................. 360/54 |
| 5,146,373 | 9/1992 | Wakui et al. ....................... 360/77.14 |
| 5,191,491 | 3/1993 | Zweighaft . |
| 5,241,434 | 8/1993 | Okamoto et al. .................. 360/77.14 |
| 5,258,879 | 11/1993 | Shimotashiro et al. ............. 360/77.15 |

FOREIGN PATENT DOCUMENTS 1-113946  5/1989  Japan ................................. 360/77.14

OTHER PUBLICATIONS

The DAT Conference Standard, Jun. 1987, pp. 22–26.

*Primary Examiner*—Aristotelis M. Psitos
*Assistant Examiner*—Larry T. Cullen
*Attorney, Agent, or Firm*—Nixon & Vanderhye, P.C.

[57] ABSTRACT

In a helical scan system for recording information on a storage media in a series of helical tracks, servo information written on the tracks is used to control linear velocity of the media during a write operation. Helical scan system includes a rotating drum upon which write heads and read heads circumferentially are mounted. The write heads and the read heads are positioned on the drum so that during a drum revolution a read head reads servo information recorded on a track at least 1.5 track pitches upstream from the most recently recorded track. A servo controller analyzes, during the recording operation, servo information read back by the read head subsequent to recording thereof by write head. Servo controller uses the servo information read by the read head to generate a signal for application to a motor for controlling linear velocity of the media during the write operation.

18 Claims, 8 Drawing Sheets

TRACK-WHILE-WRITE ERROR VS. TAPE SPEED ERROR

METHOD AND APPARATUS FOR CONTROLLING MEDIA LINEAR SPEED IN A HELICAL SCAN RECORDER BY READING SERVO INFORMATION JUST AFTER WRITING THE SERVO INFORMATION

CROSS REFERENCE TO RELATED APPLICATIONS

This application is a continuation-in-part of U.S. application Ser. No. 08/150,726, filed Nov. 12, 1993, now abandoned, by Georgis et al. and entitled "METHOD AND APPARATUS FOR CONTROLLING MEDIA LINEAR SPEED IN A HELICAL SCAN RECORDER", which is commonly assigned herewith and incorporated herein by reference.

BACKGROUND

1. Field of Invention

This invention pertains to method and apparatus for recording information on magnetic storage media, and particularly to method and apparatus for controlling linear velocity of the storage media for a helical scan drive during recording.

2. Related Art and Other Considerations

Numerous prior art patents and publications teach recording and reading of information stored in helical stripes (or "tracks") on magnetic tape. In a helical scan arrangement, travelling magnetic tape is at least partially wrapped around a rotating drum so that heads (both write heads and read heads) positioned on the drum are contiguous to the drum as the drum is rotated. One or more write heads on the drum physically record data on the tape in a series of discrete stripes oriented at an angle with respect to the direction of tape travel. The data is formatted, prior to recording on the tape, to provide sufficient referencing information to enable later recovery during readout by one or more read heads.

Helical scan recorders require that the read and write heads be correctly aligned with the stripes of recorded information on the magnetic tape. To this end, servo signals, sometimes referred to as "pilot" signals, are embedded in servo "zones" in each stripe. See, for example, U.S. Pat. No. 4,843,495 to Georgis et al., entitled "Cyclical Servo Zone Tracing Method and Apparatus for Helical Scan Recording Devices" and incorporated herein by reference.

U.S. Pat. No. 5,068,757 to Hughes et al., entitled "Servo Tracking For Helical Scan Recorder" and incorporated herein by reference, illustrates a dual azimuth helical scan system. In this particular dual azimuth helical scan system, a servo head is provided for the purpose of detecting servo signals recorded on stripes of only one of the azimuthal angles (e.g., recorded on alternating stripes). In addition, this system provides a "read-after-write" capability. According to this capability, after two stripes are simultaneously written by two write heads during a first half of a drum revolution, two corresponding read heads reproduce the information on the two stripes during a second half of the same drum revolution for verification purposes.

In a recording operation in a helical scan system, linear velocity of the tape (travelling from a supply reel, at least partially around the drum, and to a take-up reel) must be accurately controlled at a constant speed to guarantee the proper pitch of the stripes. As used herein, track or stripe "pitch" means a distance between centerlines of two adjacent tracks, the centerlines of the tracks extending along the direction of head travel and the distances therebetween being taken perpendicularly to the centerlines. In a dual azimuth system, track pitch equates to the width of a track. Typically, track stripe pitch must be controlled within a tolerance of no greater than one percent.

Several factors hinder maintenance of a constant tape linear velocity in a helical scan system. One factor is that the reels cannot be made perfectly round, and any perceptible eccentricity modulates tape linear velocity. "Run out" also causes asymmetry, causing tape linear velocity to deviate by variations in tape pack radii. Yet another factor is that the reel motor may cause the reel to wobble and thereby affect tape linear velocity.

In many prior art helical scan systems, a fixed-radius, capstan is provided to control the linear motion to the tape as the tape travels past the drum. The capstan is driven by a dedicated capstan motor. In capstan systems, a tachometer is typically provided on the capstan to provide feedback information for ensuring constant linear velocity of the tape.

Other helical scan systems (known as "reel-to-reel) do not employ a capstan. Once such example, U.S. Pat. No. 4,125,881 to Eige et al. (incorporated herein by reference) does not provide tape linear, velocity control, but instead resorts to placement of tachometers on both reel shafts in an effort to control reel angular velocity. However, constant control of reel motor speed can result in sinusoidal modulation of tape linear velocity if the tape radius is not constant or not accurately known.

In a reel-to-reel type system, the radius of the tape pack on the reel which controls linear tape speed must be known, and is assumed to be constant around the circumference of the tape at any given time. Numerous techniques exist in the prior art for calculating or measuring the tape pack radius. Given a known, constant value of tape radius, the linear tape speed can be controlled by maintaining the angular velocity of the reel.

While it may be postulated in a capstanless helical scan system to install a linear speed transducer (e.g., a digital position encoder) in the tape path, such installation would entail additional complicating components and increased manufacturing costs.

SUMMARY

In a helical scan system for recording information on a storage media in a series of helical tracks, servo information written on the tracks is used to control linear velocity of the media during a write operation. In other words, track pitch information is used to control linear velocity of the media during a write operation.

The helical scan system includes a rotating drum upon which write heads and read heads are mounted. The write heads and the read heads are positioned on the drum so that during a drum revolution a read head reads servo information recorded on a track at least 1.5 track pitches upstream from the most recently recorded track. That is, the read heads are positioned on the drum opposite and offset from the write heads such that as the tape (22) is moved, the read heads read data that was written by the write heads at least 1.5 rotations of the drum previously.

In the helical scan system the tape traverses a media path which includes a supply reel, at least a portion of a circumference of the rotating drum, and a take-up reel. Both reels are drive by respective motors. One motor, preferably the tape-up reel motor, is used to control the linear tape speed.

The helical scan system further includes a write formatter for formatting write information including servo information. During a recording operation, at least the servo information is transmitted to the write head so that the servo information may be recorded in at least some of the helical tracks.

A servo controller analyzes, during the recording operation, the servo information read back by the read head subsequent to recording thereof by the write head. The servo controller digitizes the amplitude of the servo signals read by the read head. A control microprocessor calculates a speed correction value based on that information for application to one or both of the reel motors.

The write formatter also formats servo search field information, and transmits, during a recording operation, the servo information and the servo search field information to the write head so that the servo search field information is recorded on odd numbered ones of the tracks and the servo information is recorded on even numbered ones of the tracks. The servo search field information and the servo information is recorded in a manner such that, as the read head reads an odd numbered track, the read head reads a first occurrence of servo search field information on the odd numbered track, followed by servo information recorded on a first adjacent even numbered track, followed by servo information recorded on a second adjacent even numbered track, followed by a second occurrence of servo search field information on the odd numbered track.

The recording frequency of the servo search field information is preferably approximately fifty times that of the servo information. In one embodiment, the recording frequency of the servo information is 530 kHz and each recording of the servo information is along a portion of the track having a length equal to track skew.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
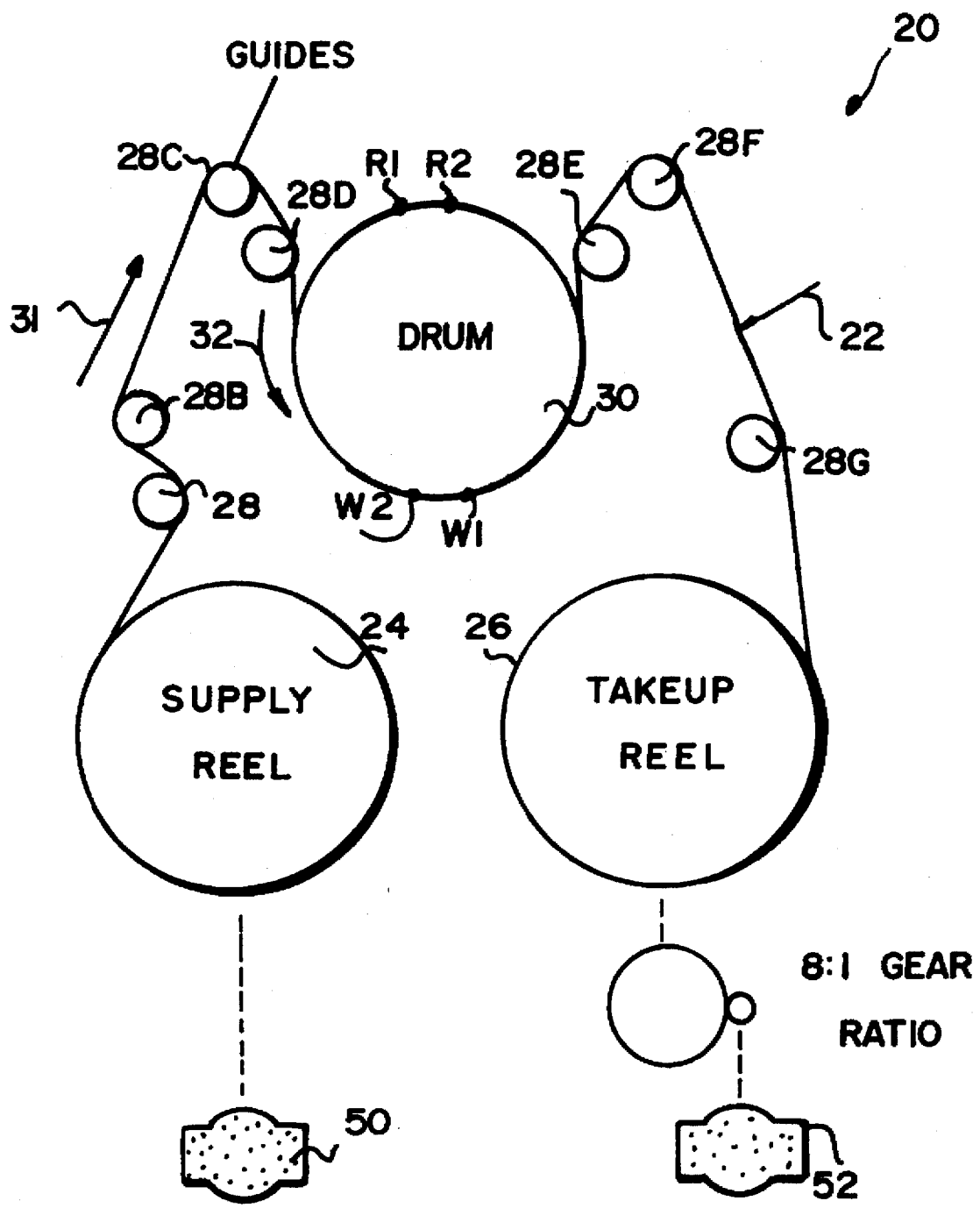
FIG. 1 is a schematic view of a capstanless tape path for a helical scan recording system according to an embodiment of the invention.

FIG. 1 shows a capstanless tape path for a helical scan recording system generally depicted by reference numeral 20. In particular, FIG. 1 shows a magnetic tape 22 (such as an 8 mm magnetic tape, for example) having a first end wound around a supply reel 24 and a second end wound around a take-up reel 26. The path traversed by tape 22 is defined at least in part by a series of tape guides 28A–28G and a rotating scanner or drum 30. In all operations excepting a rewind operation, tape 22 travels from supply reel 24 to take-up reel 26 in the direction depicted by arrow 31.

Figure 2:
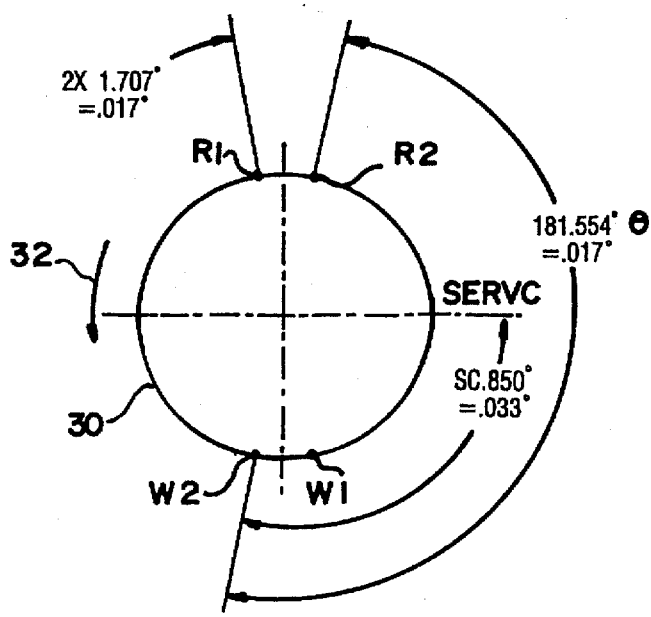
FIG. 2 is a schematic end view of a drum utilized in the helical scan recording system of FIG. 1.
Figure 4:
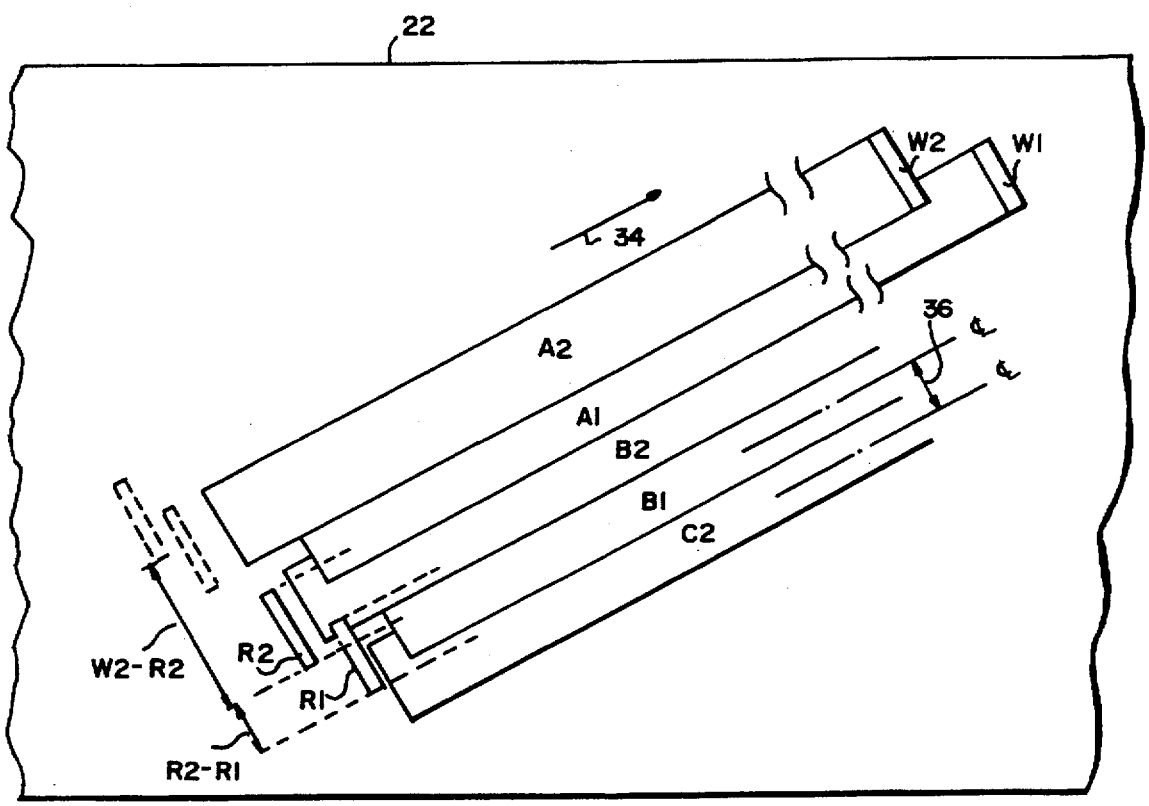
FIG. 4 is a schematic representation of track formation and head travel relative to a tape for the helical scan recording system of FIG. 1.

As shown both in FIG. 1 and FIG. 2, drum 30 has read heads R1 and R2 as well as write heads W1 and W2 mounted on the circumference thereof (the exact positioning of which will be described below). Drum 30 rotates in the direction depicted by arrow 32. As drum 30 rotates, at any moment a portion of its circumference is in contact with travelling tape. During a recording or write operation, write heads W1 and W2 are periodically positioned to record "stripes" or "tracks" (such as tracks C2, B1, B2, A1, and A2 shown in FIG. 4) as heads W1 and W2 move in a direction of head travel (depicted by arrow 34 in FIG. 4) across tape 22. FIG. 4 also depicts track pitch (depicted by arrow 36 in FIG. 4) which (in the illustrated dual azimuth system) is also essentially the width of the track (after recordation of neighboring tracks) in a direction perpendicular to the track centerline (the track centerline optimally being parallel to direction 34).

Although helical scan system 20 of the embodiment of FIG. 1 further includes a servo head S, servo head S is not used in connection with the present invention (it being understood that servo signals are instead read by head R1). Rather, servo head S is included merely for compatibility for reading formats for other recording systems.

For reasons previously explained, it is highly desirable to maintain the same track pitch for all tracks. However, track pitch is a function of the linear velocity of tape 22 as tape 22 travels along its path from reel to reel (in the direction of arrow 31 in FIG. 1). Accordingly, control of linear velocity of tape 22 is necessary in order to assure uniform track pitch. As explained below, the helical scan recording system accomplishes such control during a write or recording operation.

Control of the linear velocity of tape 22 according to the present invention involves inter alia a strategic placement of servo zones in conjunction with a read-after-write operation. As explained below, the read-after-write operation of the present invention differs from prior read-after-write procedures in view of a number of factors, including vertical positioning of heads on drum 30.

In the above regard, a read-after-write procedure is taught in the above-referenced and incorporated U.S. Pat. No. 5,068,757 to Hughes et al., entitled "Servo Tracking For Helical Scan Recorder". While U.S. Pat. No. 5,068,757 shows a drum having heads radially mounted thereon in a similar manner as the present invention, the vertical or axial locations of the heads in U.S. Pat. No. 5,068,757 is completely different. In U.S. Pat. No. 5,068,757, for checking purposes the head heads read back two simultaneously written tracks approximately 180 degrees drum rotation after the tracks are written.

While servo information is recorded on the tape in many examples of prior art, no attempt was made to use it until after the write process. As explained below, in the present invention, by shifting the position of the read heads so that the read heads encounter data written 1.5 turns previously, the effect of linear speed variations is significant enough to be useful. The relationship between the servo signal and tape speed in a playback-only situation is quite different than if the data has been written 1.5 turns previously. Those skilled in the art will appreciate that this is the difference between position and velocity feedback.

STRUCTURE: HEAD VERTICAL POSITIONING

Figure 3:
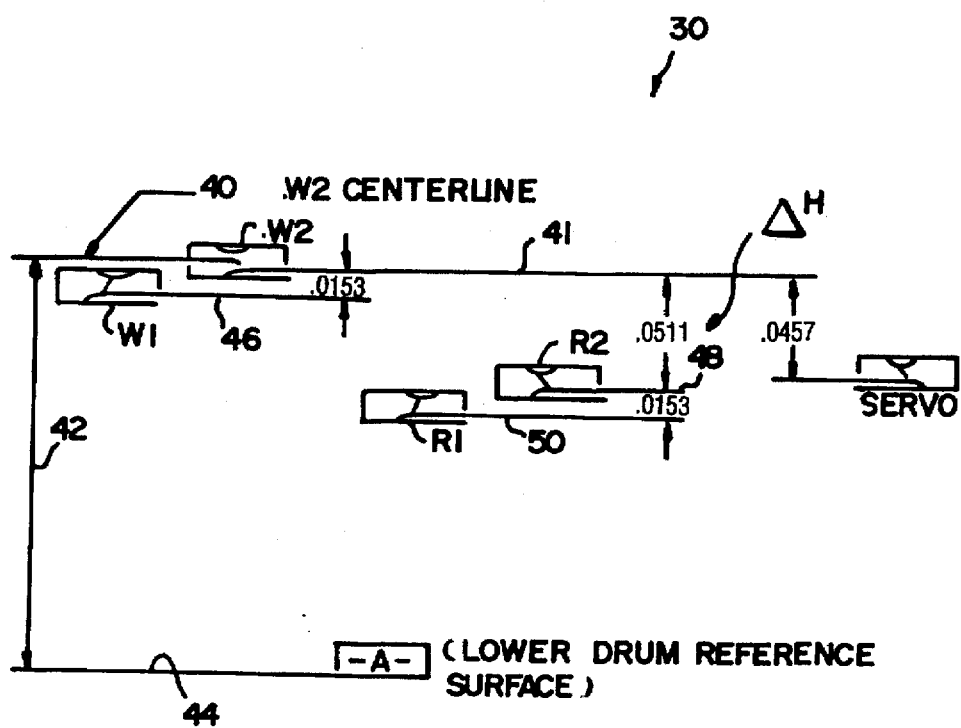
FIG. 3 is a schematic depiction of vertical positioning of heads on the drum of FIG. 2.

FIG. 3 is a schematic depiction of vertical positioning of heads W1, W2, R1 and R2 on drum 30 of the present invention. FIG. 3 shows drum 30 as if its circumferential surface were cut and rolled out in planar fashion. In FIG. 3, a centerline 40 of head W2 is shown to be located a distance 42 above a drum reference surface 44 (e.g., the lower axial surface of drum 30). FIG. 3 further shows that a lower edge line 46 of head W1 is located a distance 0.0153 microns below a lower edge line 41 of head W1; that a lower edge line 48 of head R2 is located a distance 0.0511 microns below lower edge line 41; and, that a lower edge line 50 of head R1 is located a, distance 0.0153 microns below lower edge line 48. The distance separating the lower edge lines 41 and 48, known as the "head 2 offset", is depicted by the distance $\Delta H$.

Placement of heads W1, W2, R1 and R2 on drum 30 results in the formation of tracks as shown in FIG. 4. In particular, as tape 22 travels past rotating drum 30, heads W1, W2, R1 and R2 travel in the direction shown by arrow 34. In view of the vertical offsets of the heads as described with reference to FIG. 3, FIG. 4 shows that as write heads W1 and W2 finish recording their respective tracks A1 and A2 during a first half of a drum revolution, read heads R1 and R2 are almost ready to (during the second half of the same drum revolution) read-back tracks B1 and B2, respectively. Tracks B1 and B2 about-to-be-read by heads R1 and R2 respectively in FIG. 4 were written during the revolution of drum 30 which preceded the revolution during which tracks A1 and A2 were recorded. Hence, for any track, its read-after-write reading by heads R1 and R2 occurs 540 degrees of revolution of drum 30 after the track is recorded. By now it should be apparent that FIG. 4 illustrates tracks having the numerical suffix "1" as being written by head W1 and subsequently read back by head R1. Similarly, tracks having the numerical suffix "2" are written by head W2 and subsequently read back by head R2.

Part of the track width laid down by write head W1 is immediately overwritten by write head W2, resulting in an initially wide/narrow pair of tracks. However, on the next rotation of the drum, write head W1 will overwrite part of the track A2, resulting in the same width for both tracks, and leaving no blank tape between them. No tape surface is wasted. This is called a 'perpetual overwrite' system.

The helical scan recording system 20 illustrated herein is a dual azimuth system. As such, a slight tilt (azimuth) added to both write head W1 and read head R1 for the odd numbered tracks, while an opposite tilt is applied to write head W2 and read head R2 for the even numbered tracks.

Read head R1 is deliberately made somewhat wider than one track (typically 50% wider), so that (as illustrated hereinafter) part of read head R1 will overlap a servo burst even if the centerline of read head R1 is directly over the centerline of the odd numbered track. On its other side, read head R1 will typically also overlap the opposite even numbered track.

In view of the fixed distance between lower head line 41 of head W2 and lower head line 46 of head W1, it should be understood that the pitches of tracks recorded by head W1 (e.g., tracks A1, B1, etc.) will always be uniform regardless of the linear velocity of tape 22. However, the linear velocity of tape 22 influences how close track pair A1, A2 will be recorded next to track pair B1, B2, thereby affecting the pitch of track B2. For example, if the linear velocity of tape 22 is slower than nominal, track B2 will be wider than track B1. Accordingly, the linear velocity of tape 22 must be controlled so that the pitch of track B2 (as well as other tracks written by head W2) will be uniform with other tracks.

As illustrated in FIG. 1, the tape drive system 20 of the present embodiment is a reel-to-reel drive, and accordingly does not have a dedicated tape linear speed sensor (such as a tachometer on a capstan). Nevertheless, the tape drive system 20 of the present invention provides means for controlling the linear velocity of tape 22. The following descriptions of servo zones and system electronics are precursors to a fuller discussion of the structure and operation of the linear velocity control aspects of the present invention.

STRUCTURE: SERVO ZONES

As indicated above, servo zones recorded on at least selected tracks are utilized by the present invention for controlling the linear velocity of tape 22. In the illustrated embodiment, servo zones are recorded on tracks written by write head W2. Tracks written by write head W2 are formatted to have servo zones written at one or more predetermined locations along the track. The choice of particular locations along the track is not material to the present invention, although in the preferred embodiment servo zones are recorded near the beginning, near the center, and near the end of tracks recorded by head W2.

Figure 7:
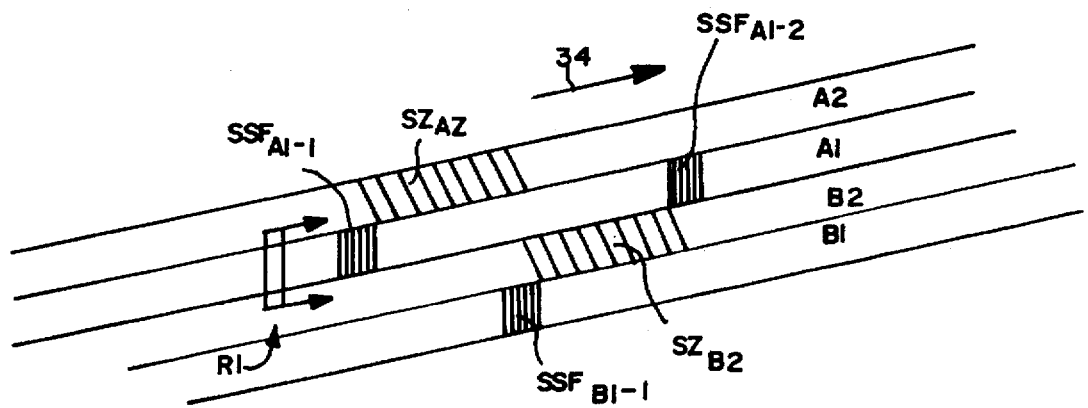
FIG. 7 is a schematic view depicting the location of a servo zone recorded on a track of tape by the helical scan recording system of FIG. 1.

FIG. 7 shows a servo zone $SZ_{B2}$ recorded on track B2 by write head W2, as well as a servo zone $SZ_{A2}$ recorded on track A2 (one drum revolution later) by write head W2. Servo zones $SZ_{B2}$ and $SZ_{A2}$ are recorded at essentially the same distances from the beginning of the tracks in which they lie.

FIG. 7 also shows that tracks recorded by write head W1 are formatted to include a plurality of servo search fields (SSF). In particular, FIG. 7 shows a servo search field $SSF_{A1-1}$ on track A1 in a location just prior to the beginning of the servo zone to-be-recorded on an upstream neighboring track by write head W2 (i.e., servo zone $SZ_{A2}$ on track A2), as well as a servo search field $SSF_{B1-1}$ on track A1 in a location just after the end of the servo zone recorded on a downstream neighboring track by write head W2 (i.e., servo zone $SZ_{B2}$ on track B2). Similarly, track B1 has $SSF_{B1}$ recorded thereon just before the beginning of $SZ_{B2}$ on pair track B2 (other servo search fields on track B1 not being show).

The width of read head R1 is sufficiently large to provide overlap of the two tracks adjacent to the track followed by head R1. The overlap facilitates off-azimuth pick up of signals recorded on the two adjacent tracks.

From FIG. 7 it can further be seen that read head R1, following a track (such as track A1) recorded by head W1, picks up signals from servo zones recorded on adjacent tracks (i.e., tracks recorded by head W2). In view of the helical scan arrangement, as shown in FIG. 7 head R1 will first encounter servo zone $SZ_{A2}$ and then, a predetermined time later, encounter servo zone $SZ_{B2}$ (since the beginning of the respective tracks A2 and B2 are offset with respect to one another along the direction of head travel as depicted by arrow 34). If read head R1 is aligned exactly with track A1, read head R1 will pick up equal amplitude low-frequency servo signals first from servo zone (or "burst") $SZ_{A2}$, and then from $SZ_{B2}$. If the linear tape speed is not exactly nominal, read head R1 will still travel in the direction indicated by arrow 34, but will be offset to one side or another, resulting in greater overlap of read head R1 over one of the servo zones (and thus more output), and less from the other servo zone.

Figure 6:
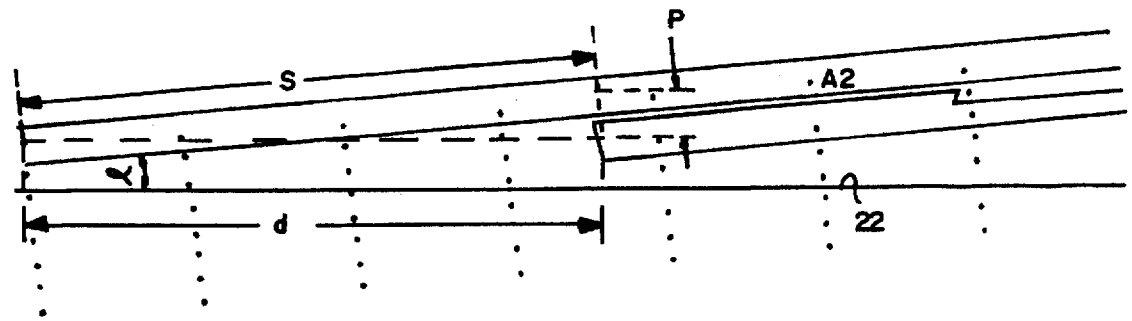
FIG. 6 is a schematic view depicting geometry of a servo zone recorded on a track of tape by the helical scan recording system of FIG. 1.

Reading of servo zones by read head R1 on adjacent tracks is facilitated by the manner in which the servo zones are formatted. FIG. 6 illustrates geometry involved in the format of a servo zone. FIG. 6 shows track pitch P and written track angle $\alpha$. For an embodiment having a track pitch of 15.5 µm, $\alpha$=4.8991 degrees, whereas for an embodiment having a track pitch of 10.75 µm, $\alpha$=4.8954 degrees. FIG. 6 also shows the distance d that tape 22 must move to create track pitch p, as well as track skew s. From the geometry it is readily apparent that s=d+(cos $\alpha$)=p+(tan $\alpha$).

In accordance with the present invention, the length of the servo zones SZ are formatted to be equal to track skew s (described above). In addition, a servo data tone recorded in the servo zone is recorded by head W2 at a low frequency 530 kHz so that it can be read by the off azimuth read head (i.e., read head R1). The servo search fields (SSFs) on the neighboring tracks recorded by write head W1 comprise a string of all "1"s recorded at a frequency approximately fifty times higher than the frequency of the servo zones. The servo zone frequency of the present invention is thus low enough to read off azimuth, yet high enough to record and overwrite easily.

Thus, as read head R1 traverses stripe A1, read head R1 first picks up the off azimuth servo signals from servo zone $SZ_{A2}$ and, a predetermined time later, picks up the off azimuth servo signals from servo zone $SZ_{B2}$. By comparing the amplitude differences between the signals obtained from servo zone $SZ_{A2}$ and servo zone $SZ_{B2}$, in a manner described in more detail hereinafter the tape drive system 20 determines an amplitude difference which is used to derive a value track_pitch_error.

STRUCTURE: DRIVE ELECTRONICS

Figure 5:
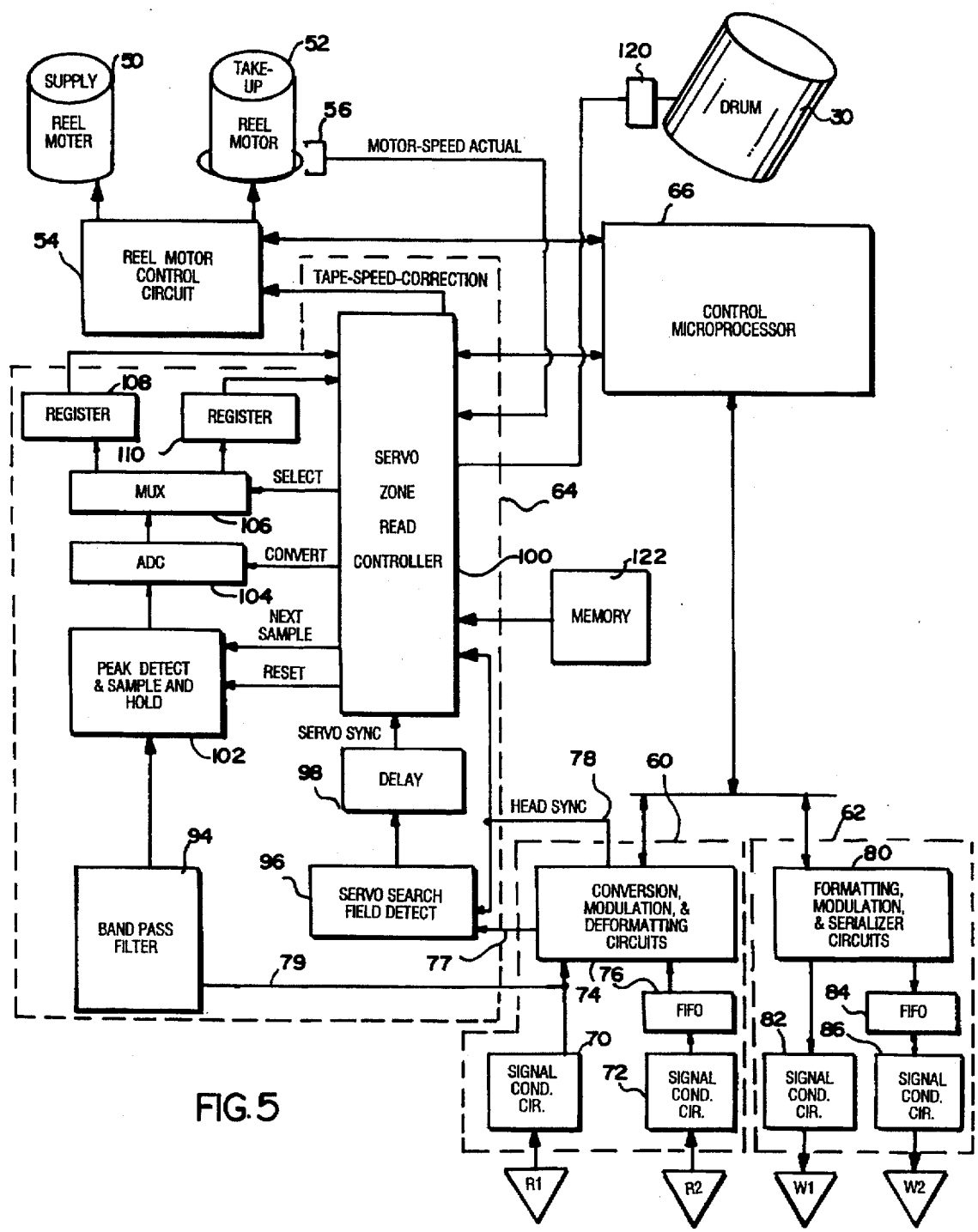
FIG. 5 is a schematic view of electronics included in the helical scan recording system of FIG. 1.

FIG. 5 shows electronics of the tape drive system 20 of the embodiment of FIG. 1, including reel motor 50 for rotating supply reel 24 and reel motor 52 for rotating take-up reel 26 and a reel motor control circuit 54. Reel motor 52 for take-up reel 26 is provided with a tachometer 56 which generates a signal motor_speed$_{actual}$. In addition, FIG. 5 shows read signal processing circuitry 60 involved in processing signals obtained from read heads R1 and R2; write signal preparatory circuitry 62; and servo signal processing circuitry 64; all under control of control microprocessor 66.

Read signal processing circuitry 60 includes signal conditioning circuits 70, 72 for conditioning signals read by read heads R1, R2, respectively. The man skilled in the art will understand that signal conditioning circuits 70, 72 include amplifiers and filters. Signal conditioning circuits 70, 72 are connected along respective channels to conversion, modulation & deformatting circuits 74. Intermediate circuits 74 and signal conditioning circuit 72 is a FIFO register 76.

Details of the read signal processing circuitry 60 are understood from the above-referenced and incorporated U.S. Pat. No. 5,068,757 to Hughes et al., entitled "Servo Tracking For Helical Scan Recorder", as well as U.S. Pat. No. 5,065,261 to Hughes et al. entitled "Method and Apparatus for Synchronizing Timing Signals for Helical Scan Recorder", also incorporated herein by reference. For purposes of the present invention, it is sufficient to know that data output from the conversion, modulation, & formatting circuits 74 is applied on line 77 to servo signal processing circuitry 64 and that read signal processing circuitry 60 produces a timing signal (HEAD_SYNC on line 78) during each rotation of drum 30. In particular, signal HEAD_SYNC is high at a time at which read head R1 travels over a track written by head W1. In addition, the signals obtained from read head R1 are applied on line 79 to servo signal processing circuitry 64.

On the write side, write signal preparatory circuitry 62 includes formatting, modulation, and serializer circuits 80. Circuits 80 are connected to output signal conditioning circuit 82 for write head W1 and through FIFO register 84 to output signal conditioning circuit 86 for write head W2. Details of the circuits 80 are likewise understood from the above-incorporated patents. In connection with the present invention, the man skilled in the art will understand how write signal preparatory circuitry 62 prepares servo zones SZ and servo search fields SSF in accordance with the criteria discussed above in connection with FIG. 6 and FIG. 7.

Servo signal processing circuitry 64 includes a bandpass filter 94; a servo search field detector 96; and, a delay 98. Bandpass filter 94 receives on line 79 the conditioned signal obtained by read head R1. Servo search field detector 96 receives the HEAD_SYNC signal on line 78. As explained hereinafter, upon detection of a search field SSF, detector 96 outputs a signal to delay 98, with delay 98 thereafter providing a SERVO_SYNC signal at the time read head R1 is anticipated to be beginning travel over a servo zone.

As further shown in FIG. 5, servo signal processing circuitry 64 also includes a servo zone read controller 100 which receives the SERVO_SYNC signal from delay 98 and thereafter sequences operations involved in reading and processing the servo signals from servo zones SZ. In this respect, servo zone read controller 100 selectively issues a RESET and NEXT_SAMPLE command to a peak detect & sample and hold circuit 102; a CONVERT command to an analog-to-digital converter (ADC) 104; a SELECT command to a MUX 106.

FIG. 5 further illustrates that output from bandpass filter 94 is applied to an input terminal of peak detect & sample and hold circuit 102. Output from peak detect & sample and hold circuit 102 is applied to an input terminal of ADC 104. A digital output terminal of ADC 104 is connected to MUX 106 which multiplexes a converted value either to register 108 or register 110. Upon request, registers 108 and 110 are connected to apply values stored therein to a data input port of servo zone read controller 100.

Controller 100 is connected to receive the signal motor_speed$_{actual}$ from take-up reel motor tachometer 56. Further, controller 100 receives a signal drum_speed from a tachometer 120 which is used to monitor revolutions of drum 30. In addition, controller 100 has access to non-volatile memory 122 in which are stored various values and constants, including K1, motor_speed$_{ref}$ (the specification speed for take-up reel 26 during a record operation), and K3 (axial offset variance).

An output terminal of servo read zone controller 100 applies a signal tape_speed_correction to reel motor control circuit 54. Examples of structural details of reel motor control circuit 54 are provided in U.S. patent application Ser. No. 08/150,727 (filed Nov. 12, 1993) of James Zweighaft entitled "Power-Off Motor Deceleration Control System" as well as in U.S. patent application Ser. No. 08/150,731 (filed Nov. 12, 1993) of James Zweighaft et al. entitled "High Performance Power Amplifier", both of which are incorporated herein by reference.

OPERATION: TAPE LINEAR SPEED CORRECTION

The present invention uses the value track_pitch_error to correct the linear velocity of tape 22. As shown in the following expressions, track_pitch_error is a function of only the actual tape speed (i.e., the variable tape_speed$_{actual}$):

EXPRESSION 1:
$$\text{track\_pitch}_{ref} = \text{tape\_speed}_{ref} \div \text{drum\_speed} \times \sin(\alpha)$$
EXPRESSION 2:
$$\text{track\_pitch}_{actual} = \text{tape\_speed}_{actual} \div \text{drum\_speed} \times \sin(\alpha)$$
EXPRESSION 3:
$$\text{read\_head\_delay\_factor} = \theta/360°$$
EXPRESSION 4:
$$\text{track\_pitch\_error} = (\text{track\_pitch}_{ref} - \text{track\_pitch}_{actual}) \times (\text{read\_head\_delay\_factor})$$
EXPRESSION 5:
$$\text{track\_pitch\_error} = (\text{tape\_speed}_{ref} - \text{tape\_speed}_{actual}) \times (\sin(\alpha) \times \theta \div \text{drum\_speed} \div 360°)$$

where tape_speed$_{ref}$, sin($\alpha$), drum_speed, and $\theta$ are all system constants.

Thus, in particular, a value for the variable tape_speed_correction is determined from the following Expression 6:
Expression 6:
$$\text{tape\_speed\_correction} = [K1 \times (\text{tape\_radius} \times (\text{motor\_speed}_{ref} - \text{motor\_speed}_{actual}))] + (K2 \times (\text{track\_pitch\_error} + K3))$$

whose terms are defined by Table 1. In Table 1, it will be understood that the values $\theta$, drum_speed, sin($\alpha$), and tape_speed$_{ref}$ are constants for a given recording format, and $\alpha$ is the recording (track) angle.

TABLE 1

| Term | Definition |
|---|---|
| K1 (constant) | a system damping constant for stablizing the control system [depending upon such system-specific parameters as motor torque constant, amplifier gain, motor resistance, motor inductance, motor damping for example ] (stored in memory 122) |
| motor_speed$_{ref}$ | the required spped of the take-up reel during a write operation calculated as (tape_speed$_{ref}$/tape_radius) |
| motor_speed$_{actual}$ | the actual speed of take-up reel as sensed by tachometer 56 |
| K2 | (drum_speed * 360) ÷ $\theta$ · sin($\alpha$), wherein $\theta$ is the angular distance between W2 and R2; drum_speed is obtained from drum tachometer 120; and $\alpha$ is recorded track angle |
| track_pitch_error | computed by controller 100 |
| K3 (constant) | axial offset variance: a constant reflecting any deviation of vertical displacement of heas W2 and R2 from specification (stored |

TABLE 1-continued

| Term | Definition |
|---|---|
| | in memory 122) |
| tape_radius | the latest calculated or measured value of the radius of the reel tape pack |

The value of the parameter tape_radius can be determined by any of several known techniques. In the illustrated embodiment, both reel motors are equipped with angular position sensors known as tachometers. If the tape is loaded and rewound to its beginning ("BOT"), the radius of both reels can easily be found by moving the tape forward and comparing the output of the tachometers. By definition, the takeup reel has minimal tape wound on it at BOT, so its radius is equal to the known radius of its hub. The supply reel radius is determined by multiplying the known takeup reel radius by the ratio of the output of the two tachometers (i.e., the ratio of the output of the takeup reel tachometer and the supply reel tachometer), as in Expression 7:

Expression 7:
$$\text{SUPPLY}_{radius} = \text{TAKEUP}_{radius} * (\text{Ttach/Stach})$$
where:
SUPPLY$_{radius}$=radius of the supply reel (unknown)
TAKEUP$_{radius}$=radius of the tapeup reel (known at BOT)
Track=output of the takeup reel tachometer (measured)
Stack=output of the supply reel tachometer (measured)
Since the total amount of tape is fixed for a given reel, so is the total surface area as indicated by Expression 8:
Expression 8
$$PI*\text{SUPPLY}_{radius}^2 + PI*\text{TAKEUP}_{radius}^2 = K4$$
where:
K4 is a known constant
PI=3.14159.

The value of K4 does not change as tape is transferred from one reel to the other. The constant K4 can be used along with the ratio of the angular motion from the tachometers at any time to determine the radius of either reel by solving the system of two equations with two unknowns (Expressions 7 and 8).

In view of numerous parameters in Expression 5 being constants or otherwise determined as described above, the value track_pitch_error (see Expression 5) is directly proportional to tape_speed$_{actual}$. In other words, deviation in tape_speed$_{actual}$ from tape_speed$_{ref}$ can be measured on a track-by-track basis via track_pitch_error. Thus, it is seen that the actual linear tape speed can be determined and controlled by measuring the track pitch error. As used herein, track pitch error is an example of track pitch information.

The larger the angle $\theta$, the larger the effect that can be measured by track_pitch_error (e.g., by the tracking error). Since it is advantageous to maximize signal-to-noise ratio, it is advantageous to maximize $\theta$. As explained above with reference to FIG. 4, angle $\theta$ can be made larger by further displacing head heights vertically on drum 30. Whereas in the prior art, the radial separation of heads was 180 degrees apart to obtain a head vertical displacement for ½ track pitch, the present invention radially separates heads by 540 degrees to obtain a head vertical displacement of 1.5 track pitch with attendant improvement in the value of track_pitch_error.

Determination of the value tape_speed_correction by servo zone read controller 100 will now be described primarily with reference to FIG. 5 and FIG. 9 and the particular example of read head R1 traversing track A1 of FIG. 7. As it does once per revolution of drum 30, read signal processing circuit 60 causes signal HEAD_SYNC to go high when read head R1 is over a track recorded by head W1. When signal HEAD_SYNC goes high on line 78, servo search field detector 96 begins looking for search field $SSF_{A1-1}$. The line of FIG. 9 labeled "R1" shows signals obtained by head R1 while traversing the servo search field $SSF_{A1-1}$ (and thereafter the essentially consecutive off-azimuth signals obtained from servo zones $SZ_{A2}$ and $SZ_{B2}$).

Detector 96 receives data from read signal processing circuit 60 on line 77. Upon detection of the string of "1"s comprising search field $SSF_{A1-1}$, detector 96 generates a signal to delay 98 corresponding to the rising edge of the pulse shown in the line of FIG. 9 labeled "SYNC". After a predetermined interval of time (one microsecond), delay 98 generates the signal SERVO_SYNC (corresponding to the falling edge of the pulse shown in line "SYNC") for application to controller 100.

In parallel with the generation of the signals HEAD_SYNC and SERVO_SYNC, the actual conditioned signal obtained by read head R1 (from track A1 and off azimuth signals from neighboring tracks) are applied on line 79 to the bandpass filter 94. The filtered output of bandpass filter 94 is shown in FIG. 9 by the line labeled "Svo Filter Out".

Controller 100 issues a NEXT_SAMPLE signal to peak detect & sample and hold circuit 102. In particular, the NEXT_SAMPLE signal is issued by controller 100 a predetermined time interval after controller 100 receives signal SERVO_SYNC. This predetermined interval, corresponding to the reaction time of bandpass filter 94, is illustrated by the first letter "b" in the line of FIG. 9 labeled "Sample" In the illustrated embodiment, this predetermined time interval "b" is on the order of about eight microseconds.

Figure 9:
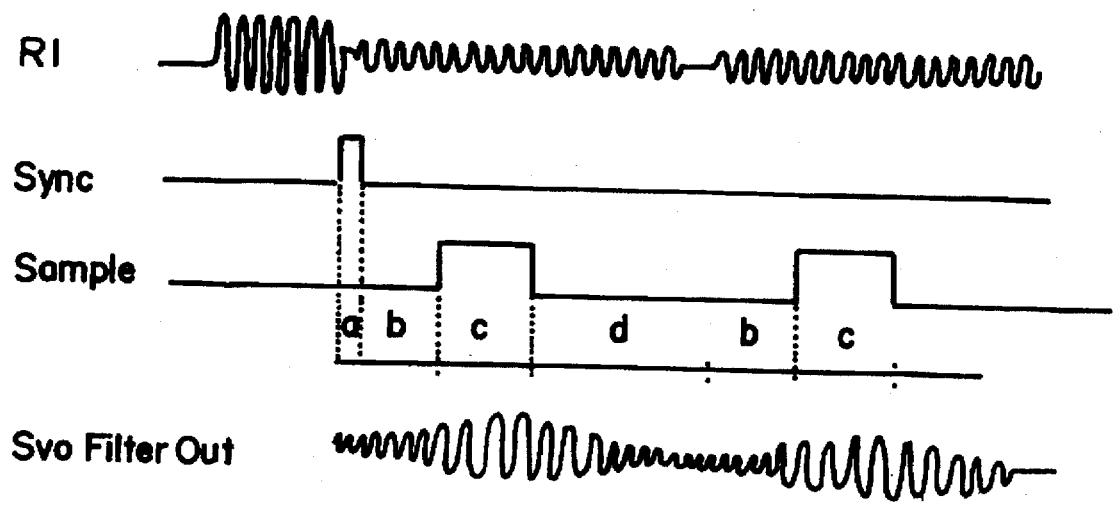
FIG. 9 is a timing chart showing waveforms and values obtained in reading servo zones recorded by the helical scan recording system of FIG. 1.

Upon receipt of the NEXT_SAMPLE command, peak detect a sample and hold circuit 102 samples the filtered signal read by head R1 for the time interval shown as the first letter "c" in line "Sample" of FIG. 9. During interval "c", the peak amplitude of the off azimuth signal obtained by read head R1 from servo zone $SZ_{A2}$ is detected. Interval "c" lasts on the order of about five microseconds, including two microseconds of peak detection. After a five microsecond timeout, the peak amplitude from servo zone $SZ_{A2}$ is gated to ADC 104 and controller 100 issues a CONVERT command to initiate analog-to-digital conversion of the peak amplitude value from servo zone $SZ_{A2}$.

The digital output of ADC 104 is gated to MUX 106. Microprocessor 66 then determines to which of registers 108, 110 the digitally converted peak amplitude value should be routed for storage, and accordingly applies an appropriate value of signal SELECT to MUX 106 to effect the routing. For the sake of the present discussion, peak amplitude values from track A2 are routed to register 108 while peak amplitude values from track B2 are routed to register 110.

After completion of peak detection and sample hold for the signal from servo zone $SZ_{A2}$, controller 100 issues a RESET command to peak detect & sample and hold circuit 102. Thereafter, controller 100 waits a predetermined time before issuing a further NEXT_SAMPLE command. This predetermined waiting time is preset in order to provide head R1 sufficient time to move along track A1 in direction 34 a sufficient distance to be able to pick up Off azimuth signals from servo zone $SZ_{B2}$ recorded on track B2. This predetermined waiting time is depicted as the interval denoted by adjacent letters "d" and "b" in line "Sample" of FIG. 9, and is on the order of about thirteen microseconds. Thus, this predetermined waiting time includes the reaction time of bandpass filter 94.

After elapse of the predetermined waiting time, the command NEXT_SAMPLE is issued to enable peak detect & sample and hold circuit 102 to obtain the peak amplitude for the servo signals recorded in servo zone $SZ_{B2}$. Peak detection and sample hold again occur for an interval "c", followed by digital conversion and storage in the same manner as aforedescribed. However, the digitally converted peak amplitude from servo zone $SZ_{B2}$ is stored in register 110 rather than register 108.

When the peak amplitude of servo zone $SZ_{A2}$ is stored in register 108 and the peak amplitude of servo zone $SZ_{B2}$ is stored in register 110, controller 100 takes the mathematical difference of the two amplitudes to obtain the value track_pitch_error. Further, in accordance with the above Expression 6, controller 100 determines a value for tape_speed_correction using the value track_pitch_error as well as other inputs described above, including motor_speed$_{actual}$ from tachometer 56 on take-up reel motor 52; and calculated motor_speed$_{ref}$, θ, K1, K2, and K3 (axial offset variance) stored in memory 122.

It should be understood that the foregoing steps are repeated for each paired occurrence of servo zones. For example, in the embodiment above described, servo zones are read not only near the beginning, but also near the center and ends of tracks written by head W2. In this respect, while head R1 is traversing a track, servo search field detector 96 monitors the signals on line 77 for the next servo search field SSF until the end of track is encountered.

Thus, from the foregoing it is seen that the servo search field information (e.g., SSF) is recorded at normal (high) data frequencies in the odd numbered tracks, just preceding the occurrence of the low frequency servo burst (e.g., $SZ_{A2}$) in the adjacent even numbered track, for which they serve as a marker. After read head R1 for the odd numbered track encounters the servo search field (SSF) signal, servo controller (100) starts a timer (98) used to determine when read head R1 is beside the servo burst (e.g., $SZ_{A2}$) written in the adjacent track. Because read head R1 is deliberately made somewhat wider than one track (typically 50% wider), part of read head R1 will overlap the servo burst (SZ) at this time, even if the centerline of read head R1 is directly over the centerline of the odd numbered track. On its other side, read head R1 will typically also overlap the opposite even numbered track. The tape format is arraigned to have a high frequency signal recorded in this area.

When positioned along side a servo burst (SZ), the output of read head is a combination of signals from three tracks: high frequency from the odd numbered track with which read head R1 is substantially aligned, plus two smaller signals: low frequency from the side of read head R1 which overlaps the servo burst, plus high frequency from the opposite side which overlaps the third track. Frequency filtering easily separates the low frequency servo burst from the high frequency signals.

As mentioned above, in this dual azimuth system a slight tilt (azimuth) is added to both write head W1 and read head R1 for the odd numbered tracks, while an opposite tilt is applied to write head W2 and read head R2 for the even numbered tracks. This technique facilitates separating the three signals because the low frequency servo signal is substantially unaffected by azimuth loss, while the high frequency read from the other side of the read head is attenuated due the mismatched azimuth.

The extent to which read head R1 overlaps the servo burst SZ determines the amplitude of the low frequency signal. If read head R1 is slightly off center of the odd numbered track, biased toward the servo burst SZ on the even numbered track, read head R1 will pick up more of the low frequency servo signal. If read head R1 is off center in the opposite direction, less of head R1 will overlap the servo burst SZ and consequently the low frequency signal will be smaller. This overlap constitutes a direct measure of track pitch and is the basis of the speed correction factor calculated by microprocessor 66 and applied to the reel motors 50, 52.

Because signal amplitude can also vary with many other factors such as the quality of the tape, the servo zones SZ are read in pairs and the difference between them is used as the error signal.

The relative placement of the read heads and write heads directly affects the "gain" of this track pitch signal, meaning how much the servo signal amplitude changes for a given change in linear tape speed. If the read heads are placed close to the write heads the effect is nil. The further apart on the drum they are placed, the higher the gain. For reasons of crosstalk from the write to the read heads, it is common practice to place them opposite of each other on the scanner (e.g., drum 30). If writing occurs for one-half a turn of drum 30, the read heads can be active when the write heads are not operating, thus avoid "crosstalk".

Heads placed 180 degrees apart on drum 30 must also be shifted slightly in a direction parallel to the axis of rotation of the drum to account for the distance the tape moves in the time it takes for the read heads to catch up to the data being written earlier. This direction parallel to the axis of rotation of the drum is referred to as the "down" direction. This shift in position can occur in discrete amounts corresponding to the track pair pitch (distance between pairs of tracks). Thus read heads placed 180 degrees apart from the write heads must be shifted n*0.5 track pair pitches down, where n can be 1, 2, 3 or more. In a system with the read heads displaced 0.5 track pitches down, they will encounter the track just 180 degrees after it was written. If n=2, the read heads will encounter the track 180+360=540 degrees after it was written, and so on. In the preferred embodiment, n≧2 and preferably n=2.

Figure 8A:
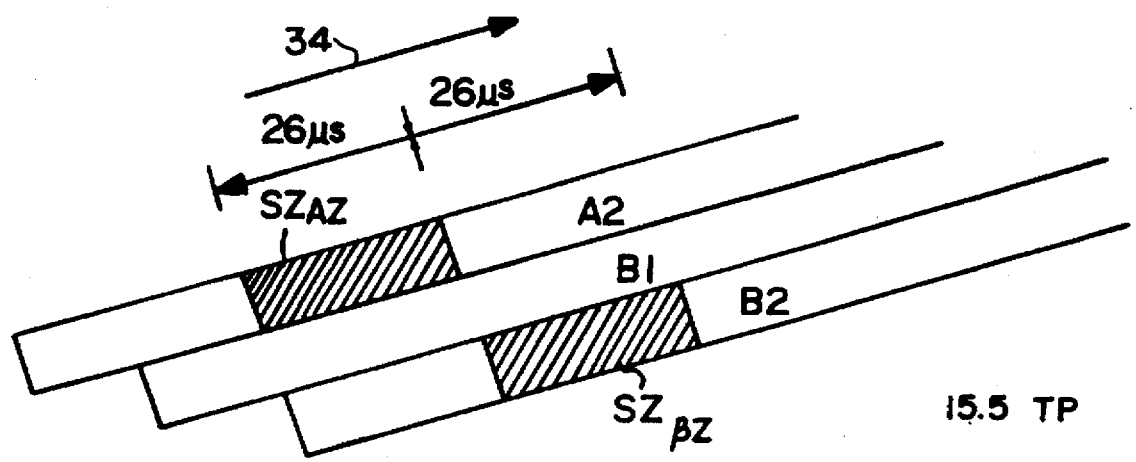
FIGS. 8A and 8B are schematic views showing differing juxtapositions of servo zones in accordance with differing physical characteristics of the helical scan recording system of FIG. 1.
Figure 8B:
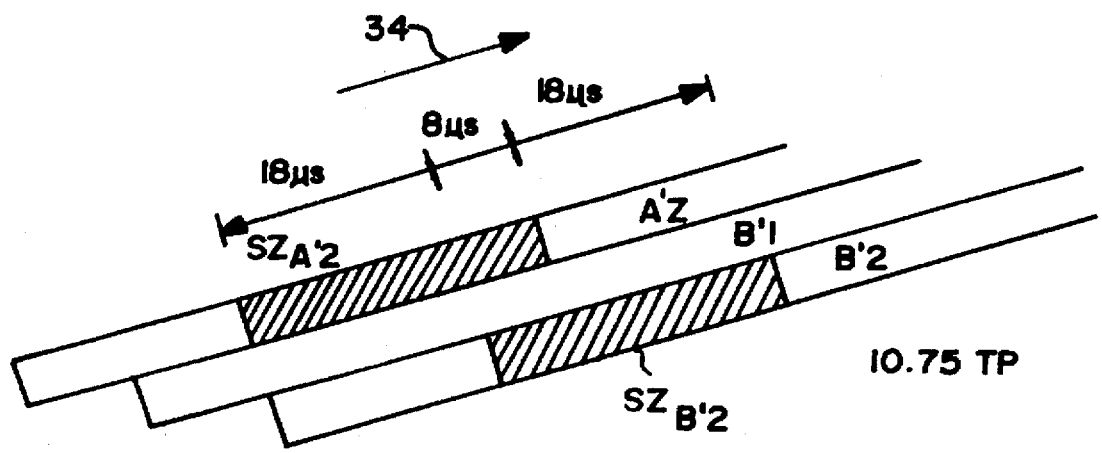

FIG. 8A basically corresponds to FIG. 7 in showing that servo zones $SZ_{A2}$ and $SZ_{B2}$ each have a non-overlapping projection along direction 34. The FIG. 8A embodiment is a 15.5 micrometer track pitch embodiment, with read head R1 picking up servo signals from each servo zone SZ for approximately twenty-six microseconds. The FIG. 8B embodiment, by contrast, is a 10.75 track pitch embodiment, showing overlapping servo zones $SZ_{A'2}$ and $SZ_{B'2}$, each having a head traversal time of about eighteen microseconds with an eight second microsecond overlap. The FIG. 8B embodiment has advantage in that the eight microsecond overlap can provide additional time for ADC 104 to perform its conversion.

Figure 10A:
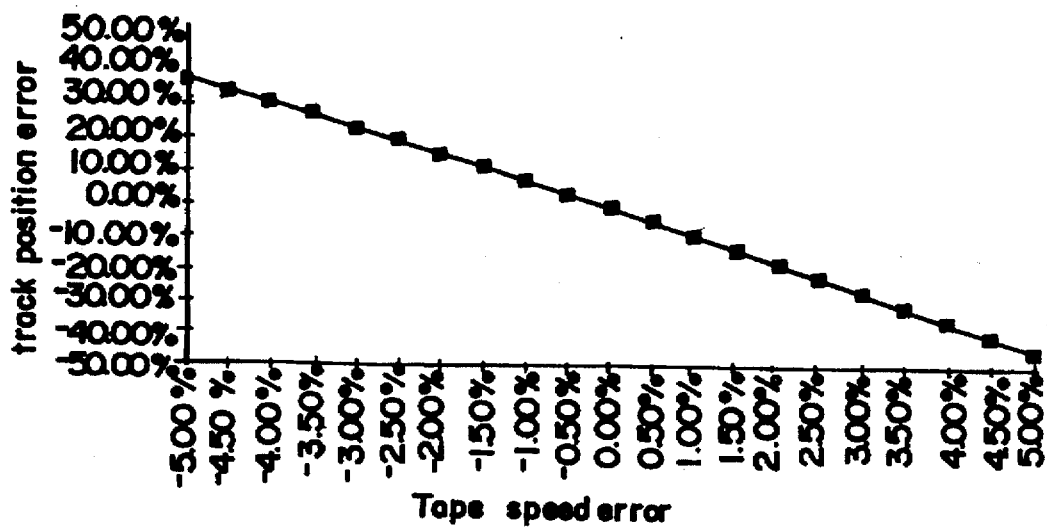
FIGS. 10A and 10B are graphs of track-while-write error as a function of tape speed error.
Figure 10B:
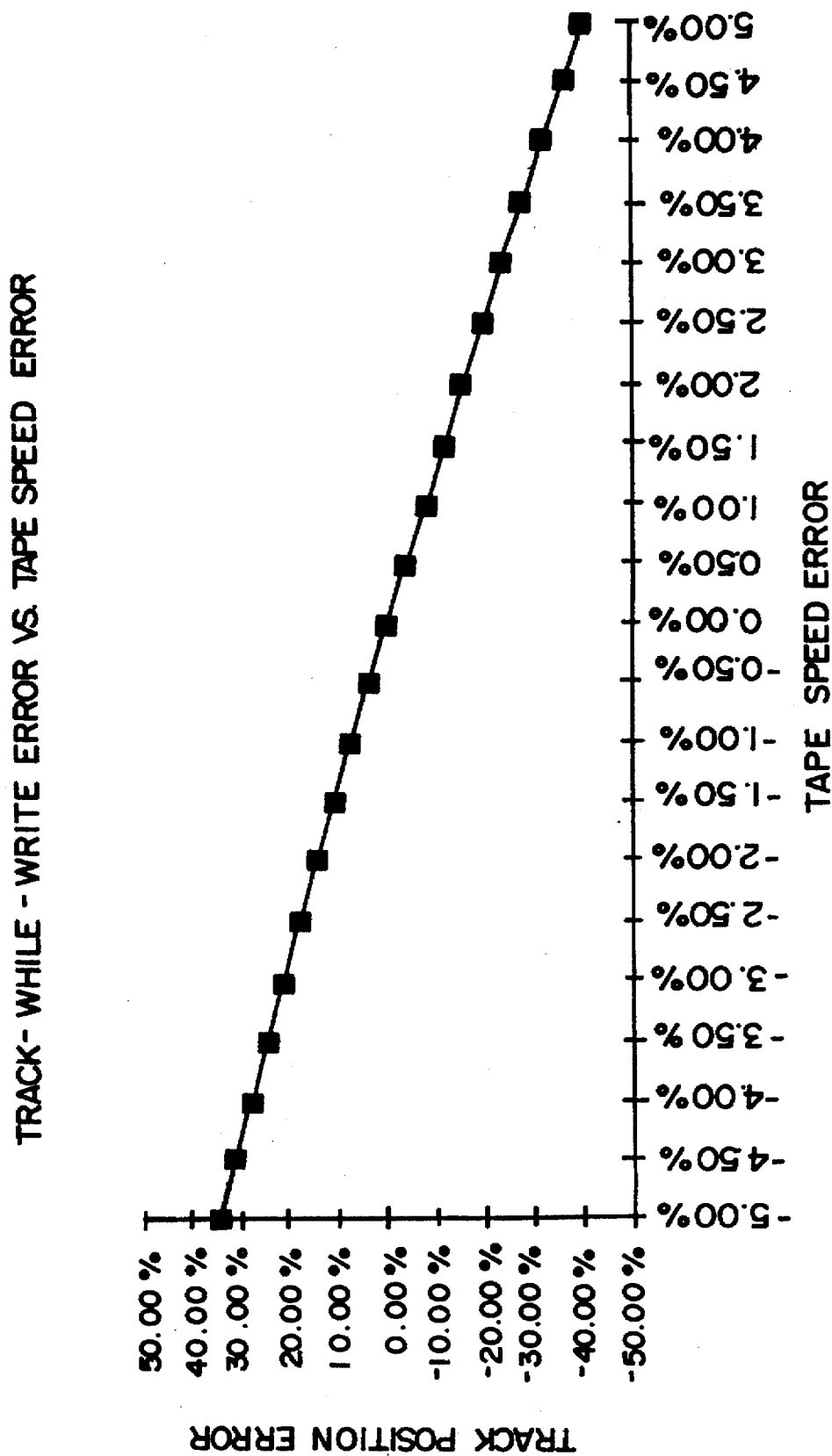

Table 2 shows inter alia interrelationships between actual tape speed (linear velocity of tape 22), written track width (i.e. track pitch), track_pitch_error (R2 centerline error), and tape_speed_correction (speed error) for an embodiment having 15.5 nominal track pitch. Table 3 similarly shows inter alia interrelationships for an embodiment having 10.75 nominal track pitch. FIG. 10A shows a graph of track-while-write error (track_pitch_error) as a function of tape speed error for the embodiment having 15.5 nominal track pitch, and reveals an essentially linear relationship. FIG. 10B shows a similar graph for the embodiment having 15.5 nominal track pitch.

For a drum 30 in which the distance separating the head lower edge lines 41 and 48, known as the "head 2 offset" and depicted by the distance ΔH (see FIG. 3) varies from specification, the term K3 ("axial offset variance") is non-zero. In such instance, the value of K3 can be determined from the methods disclosed in U.S. patent application Ser. No. 08/150,733 (filed Nov. 12, 1993) of Hughes et al. entitled "Method and Apparatus For Determining And Using Head Parameters in a Helical Scan Recorder" (incorporated herein by reference).

Although not deemed necessary for an understanding of the present invention, reference is made to U.S. patent application Ser. No. 08/150,730 (filed Nov. 12, 1993) now abandoned, of Robert J. Miles and James Zweighaft entitled "Capstanless Helical Drive System" (incorporated herein by reference) for a detailed understanding of the particular capstanless tape path partially depicted in FIG. 1. Further, Table 4 provides magnitudes and units of various specification structural features and operating parameters of the embodiment having 15.5 nominal track pitch. Table 5 provides corresponding data for the embodiment having nominal 10.75 track pitch.

While the invention has been particularly shown and described with reference to the preferred embodiments thereof, it will be understood by those skilled in the art that various alterations in form and detail may be made therein without departing from the spirit and scope of the invention. Moreover, although the particular media illustrated herein is magnetic tape, the invention is not limited thereto but can be used with other media employed in a helical scan environment.

TABLE 2

| Actual Tape Speed | Written Track Width | R1 Center line Error | R1 head overlap − | R1 head overlap + | Speed Error | Tracking Error |
|---|---|---|---|---|---|---|
| 31.56 | 14.73 | 1.94 | 7.08 | 3.20 | −5.00% | 37.71% |
| 31.73 | 14.80 | 1.74 | 6.84 | 3.36 | −4.50% | 34.20% |
| 31.90 | 14.88 | 1.55 | 6.61 | 3.51 | −4.00% | 30.63% |
| 32.06 | 14.96 | 1.36 | 6.38 | 3.67 | −3.50% | 27.01% |
| 32.23 | 15.04 | 1.16 | 6.15 | 3.82 | −3.00% | 23.33% |
| 32.40 | 15.11 | 0.97 | 5.91 | 3.98 | −2.50% | 19.60% |
| 32.56 | 15.19 | 0.77 | 5.68 | 4.13 | −2.00% | 15.80% |
| 32.73 | 15.27 | 0.58 | 5.45 | 4.29 | −1.50% | 11.94% |
| 32.89 | 15.35 | 0.39 | 5.22 | 4.44 | −1.00% | 8.03% |
| 33.06 | 15.42 | 0.19 | 4.98 | 4.59 | −0.50% | 4.05% |
| 33.23 | 15.50 | 0.00 | 4.75 | 4.75 | 0.00% | 0.00% |
| 33.39 | 15.58 | −0.19 | 4.52 | 4.91 | 0.50% | −4.11% |
| 33.56 | 15.66 | −0.39 | 4.29 | 5.06 | 1.00% | −8.29% |
| 33.72 | 15.73 | −0.58 | 4.05 | 5.21 | 1.50% | −12.54% |
| 33.89 | 15.81 | −0.77 | 3.82 | 5.37 | 2.00% | −16.87% |
| 34.06 | 15.89 | −0.97 | 3.59 | 5.52 | 2.50% | −21.26% |
| 34.22 | 15.97 | −1.16 | 3.35 | 5.68 | 3.00% | −25.73% |
| 34.39 | 16.04 | −1.36 | 3.12 | 5.84 | 3.50% | −30.28% |
| 34.55 | 16.12 | −1.55 | 2.89 | 5.99 | 4.00% | −34.91% |
| 34.72 | 16.20 | −1.74 | 2.66 | 6.15 | 4.50% | −39.62% |
| 34.89 | 16.28 | −1.94 | 2.42 | 6.30 | 5.00% | −44.41% |

TABLE 3

| R1 Head Width: 18 μm | | | | | | |
|---|---|---|---|---|---|---|
| Actual Tape Speed | Written Track Width | Head Position Error | R1 head overlap − | R1 head overlap + | Speed Error | Tracking Error |
| 22.59 | 10.21 | 1.34 | 5.24 | 2.55 | −5.00% | 34.51% |
| 22.70 | 10.27 | 1.21 | 5.08 | 2.66 | −4.50% | 31.28% |
| 22.82 | 10.32 | 1.08 | 4.92 | 2.77 | −4.00% | 27.99% |
| 22.94 | 10.37 | 0.94 | 4.75 | 2.87 | −3.50% | 24.67% |
| 23.06 | 10.43 | 0.81 | 4.59 | 2.98 | −3.00% | 21.29% |
| 23.18 | 10.48 | 0.67 | 4.43 | 3.09 | −2.50% | 17.87% |
| 23.30 | 10.54 | 0.54 | 4.27 | 3.20 | −2.00% | 14.40% |
| 23.42 | 10.59 | 0.40 | 4.11 | 3.30 | −1.50% | 10.88% |
| 23.54 | 10.64 | 0.27 | 3.95 | 3.41 | −1.00% | 7.31% |

TABLE 3-continued

R1 Head Width: 18 μm

| Actual Tape Speed | Written Track Width | Head Position Error | R1 head overlap − | R1 head overlap + | Speed Error | Tracking Error |
|---|---|---|---|---|---|---|
| 23.65 | 10.70 | 0.13 | 3.79 | 3.52 | −0.50% | 3.68% |
| 23.77 | 10.75 | 0.00 | 3.63 | 3.63 | 0.00% | 0.00% |
| 23.89 | 10.80 | −0.13 | 3.46 | 3.73 | 0.50% | −3.73% |
| 24.01 | 10.86 | −0.27 | 3.30 | 3.84 | 1.00% | −7.53% |
| 24.13 | 10.91 | −0.40 | 3.14 | 3.95 | 1.50% | −11.37% |
| 24.25 | 10.97 | −0.54 | 2.98 | 4.06 | 2.00% | −15.28% |
| 24.37 | 11.02 | −0.67 | 2.82 | 4.16 | 2.50% | −19.25% |
| 24.49 | 11.07 | −0.81 | 2.66 | 4.27 | 3.00% | −23.28% |
| 24.61 | 11.13 | −0.94 | 2.50 | 4.38 | 3.50% | −27.37% |
| 24.72 | 11.18 | −1.08 | 2.33 | 4.49 | 4.00% | −31.52% |
| 24.84 | 11.23 | −1.21 | 2.17 | 4.59 | 4.50% | −35.75% |
| 24.94 | 11.29 | −1.34 | 2.01 | 4.70 | 5.00% | −40.04% |

TABLE 4

| Parameter | Magnitude | Units | Notes |
|---|---|---|---|
| static parameters | | | |
| TRACKS/REVOLUTION | 2.00 | | |
| DRUM DIAMETER | 40.00 | mm | |
| TRACK ANGLE | 4.899 | degrees | |
| W1 HEAD WIDTH | 25.00 | μm | |
| W2 HEAD WIDTH | 25.00 | μm | |
| R1 HEAD WIDTH | 25.00 | μm | |
| R2 HEAD WIDTH | 25.00 | μm | |
| W1-W2 DISPLACEMENT | 596.00 | μm | |
| R1-R2 DISPLACEMENT | 596.00 | μm | |
| TRACK WIDTH | 15.50 | μm | |
| DRUM SPEED | 5493.00 | rpm | |
| Read Head Delay | 1.50 | tracks | |
| desired parameters | | | |
| TAPE SPEED | 33.23 | mm/sec | |
| W1-W2 HEAD OFFSET | −15.50 | μm | |
| R2-W2 HEAD OFFSET | −51.25 | μm | 1.5 track delay |
| R1-R2 HEAD OFFSET | −15.50 | μm | 1.5 track delay |

TABLE 5

| Parameter | Format | Units | Notes |
|---|---|---|---|
| static parameters | | | |
| TRACKS/REVOLUTION | 2 | | |
| DRUM DIAMETER | 47.0 | mm | |
| TRACK ANGLE | 4.90 | degrees | |
| W1 HEAD WIDTH | 18.0 | μm | |
| W2 HEAD WIDTH | 18.0 | μm | |
| R1 HEAD WIDTH | 18.0 | μm | |
| R2 HEAD WIDTH | 18.0 | μm | |
| W1-W2 DISPLACEMENT | 596.0 | μm | |
| R1-R2 DISPLACEMENT | 596.0 | μm | |
| TRACK WIDTH | 10.75 | μm | |
| DRUM SPEED | 5661.23 | rpm | |
| Read Head Delay | 1.50 | tracks | |
| desired parameters | | | |
| TAPE SPEED | 23.77 | mm/sec | |
| W1-W2 HEAD OFFSET | −10.75 | μm | |
| R2-W2 HEAD OFFSET | −35.88 | μm | 1.5 track delay |
| R1-R2 HEAD OFFSET | −10.75 | μm | 1.5 track delay |

The embodiments of the invention in which an exclusive property or privilege is claimed are defined as follows:

1. A helical scan system for recording information on a storage media in a series of helical tracks, the system comprising:

a write head which writes information including servo information on the storage media during a write operation;

a read head which, just after the write head writes the information, reads back at least the servo information previously written by the write head, the servo information serving in a read operation to enable positioning of at least one of the read head and the write head relative to a helical track traveled by the at least one of the read head and the write head;

a controller which uses the servo information read back by the read head for generating a signal;

a motor responsive to the signal for controlling the speed of rotation of a tape-speed-influencing element whereby servo information written on the tracks is used to control the linear velocity of the media during a write operation.

2. A helical scan system for recording information on a storage media in a series of helical tracks, the system comprising:

a write head which writes information including servo information on the storage media during a write operation;

a read head which, just after the write head writes the information, reads back at least the servo information previously written by the write head, the servo information serving in a read operation to enable positioning of at least one of the read head and the write head relative to a helical track traveled by the at least one of the read head and the write head;

a controller which uses the servo information read back by the read head to determine track pitch information and for generating a signal related to the track pitch information;

a motor responsive to the signal for controlling the speed of rotation of a tape-speed-influencing element whereby the track pitch information is used to control the linear velocity of the media during a write operation.

3. A helical scan system for recording information on a storage media in a series of helical tracks, the system comprising:

a rotating drum upon which at least one write head and one read head are mounted;

a media path traversed by the media, the media path including a media supply reel, at least a portion of a circumference of the rotating drum, and a media take-up reel;

a motor for rotating at least one of the take-up reel and the supply reel;

a write formatter for formatting write information including servo information and for transmitting, during a recording operation, at least the servo information to the write head so that the servo information may be recorded in at least some of the helical tracks, the servo information serving in a read operation to enable positioning of at least one of the read head and the write head relative to a helical track traveled by the at least one of the read head and the write head; and a servo controller connected to analyze, just after the recording of the write information, the servo information read back by the read head subsequent to recording thereof by the write head, the servo controller using the servo information to generate a signal for application to the motor for controlling linear velocity of the media during the write operation.

4. The helical scan system of claim 3, wherein the write head and the read head are positioned on the drum so that during a drum revolution the read head reads servo information recorded on a track at least 1.5 track pitches upstream from the most recently recorded track.

5. The helical scan system of claim 3, wherein the write head and the read head are radially positioned apart by at least 540 degrees on the drum.

6. The helical scan system of claim 3, wherein the write formatter formats write information including servo information and servo search field information, and transmits, during a recording operation, at least the servo information and the servo search field information to the write head so that the servo search field information is recorded on odd numbered ones of the tracks and the servo information is recorded on even numbered ones of the tracks, the servo search field information and the servo information being recorded in a manner such that, as the read head reads an odd numbered track, the read head reads a first occurrence of servo search field information on the odd numbered track, followed by servo information recorded on a first adjacent even numbered track, followed by servo information recorded on a second adjacent even numbered track, followed by a second occurrence of servo search field information on the odd numbered track.

7. The helical scan system of claim 6, wherein the recording frequency of the servo search field information is approximately fifty times that of the servo information.

8. The helical scan system of claim 6, wherein the recording frequency of the servo information is 530 kHz.

9. The helical scan system of claim 6, wherein each recording of the servo information is along a portion of the track having a length equal to track skew.

10. A helical scan recording method for recording information on a storage media in a series of helical tracks, the method comprising the steps of:
   recording servo information on the tracks of the media:
   reproducing the servo information from the tracks of the media, and
   using the reproduced servo information just after it is written on the tracks to control the linear velocity of the media during a write operation.

11. A helical scan recording method for recording information on a storage media in a series of helical tracks, the method comprising the steps of:
   recording servo information on the tracks of the media:
   reproducing the servo information from the tracks of the media, and
   using the reproduced servo information just after it is written on the tracks to determine track pitch information, and then
   using the track pitch information to control the linear velocity of the media during a write operation.

12. A helical scan recording method for recording information on a storage media in a series of helical tracks, the method comprising:
   rotating a drum upon which at least one write head and one read head are mounted;
   transporting the storage media along a media path, the media path including a media supply reel, at least a portion of a circumference of the rotating drum, and a media take-up reel;
   using a motor to rotate at least one of the take-up reel and the supply reel;
   formatting write information including servo information and transmitting, during a recording operation, at least the servo information to the write head so that the servo information may be recorded in at least some of the helical tracks, the servo information serving in a read operation to enable positioning of at least one of the read head and the write head relative to a helical track traveled by the at least one of the read head and the write head;
   analyzing, just after the recording of the write information, the servo information read back by the read head subsequent to recording thereof by the write head;
   using the servo information to generate a signal for application to the motor for controlling linear velocity of the media during the write operation.

13. The method of claim 12, wherein during the recording operation the read head reads servo information recorded on a track at least 1.5 track pitches upstream from the most recently recorded track.

14. The method of claim 12, further comprising also formatting servo search field information and wherein, during a recording operation, at least the servo information and the servo search field information is transmitted to the write head so that the servo search field information is recorded on odd numbered ones of the tracks and the servo information is recorded on even numbered ones of the tracks, the servo search field information and the servo information being recorded in a manner such that, as the read head reads an odd numbered track, the read head reads a first occurrence of servo search field information on the odd numbered track, followed by servo information recorded on a first adjacent even numbered track, followed by servo information recorded on a second adjacent even numbered track, followed by a second occurrence of servo search field information on the odd numbered track.

15. The method of claim 14, wherein the recording frequency of the servo search field information is approximately fifty times that of the servo information.

16. The method of claim 14, wherein the recording frequency of the servo information is 530 kHz.

17. The method of claim 14, wherein each recording of the servo information is along a portion of the track having a length equal to track skew.

18. A helical scan system for recording information on a storage media in a series of helical tracks, the system comprising:
   a rotating drum upon which at least one write head and one read head are mounted;
   a media path traversed by the media, the media path including a media supply reel, at least a portion of a circumference of the rotating drum, and a media take-up reel;
   a motor for rotating at least one of the take-up reel and the supply reel;
   a write formatter for formatting write information including servo information and for transmitting, during a recording operation, at least the servo information to the write head so that the servo information is recorded in at least some of the helical tracks; and
   a servo controller connected to analyze, during the recording operation, the servo information read back by the read head just after recording thereof by the write head, the servo controller using the servo information to generate a signal for application to the motor for controlling linear velocity of the media during the write operation.

* * * * *